(12) United States Patent
Onishi et al.

(10) Patent No.: US 10,610,785 B2
(45) Date of Patent: Apr. 7, 2020

(54) GAME SYSTEM, GAME CONTROL DEVICE, AND PROGRAM

(71) Applicant: KONAMI DIGITAL ENTERTAINMENT CO., LTD., Tokyo (JP)

(72) Inventors: Takashi Onishi, Tokyo (JP); Seitaro Kimura, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 255 days.

(21) Appl. No.: 15/911,175

(22) Filed: Mar. 5, 2018

(65) Prior Publication Data

US 2018/0185758 A1  Jul. 5, 2018

Related U.S. Application Data

(63) Continuation of application No. PCT/JP2016/069092, filed on Jun. 28, 2016.

(30) Foreign Application Priority Data

Sep. 14, 2015 (JP) .................................. 2015-180933

(51) Int. Cl.
*A63F 13/69* (2014.01)
*A63F 13/45* (2014.01)
(Continued)

(52) U.S. Cl.
CPC .............. *A63F 13/69* (2014.09); *A63F 13/30* (2014.09); *A63F 13/35* (2014.09); *A63F 13/45* (2014.09);
(Continued)

(58) Field of Classification Search
CPC .......... A63F 13/69; A63F 13/30; A63F 13/35; A63F 13/45; A63F 13/46; A63F 13/79; A63F 13/828; A63F 13/812
See application file for complete search history.

(56) References Cited

FOREIGN PATENT DOCUMENTS

| CN | 1577371 A | 2/2005 |
|---|---|---|
| JP | 2005-027892 A | 2/2005 |

(Continued)

OTHER PUBLICATIONS

English Translation of International Search Report for PCT/JP2016/069092 dated Aug. 30, 2016.
(Continued)

*Primary Examiner* — David L Lewis
*Assistant Examiner* — Matthew D Hoel
(74) *Attorney, Agent, or Firm* — HEA Law PLLC

(57) ABSTRACT

Provided is a game system including at least one processor configured to: select, from among a plurality of pieces of game data which are respectively associated with a plurality of pieces of user identification information, a piece of game data associated with a piece of user identification information as a usage target to be used for game processing of another piece of game data associated with another piece of user identification information, to thereby execute the game processing; determine whether or not an execution history of the game processing, which has been executed with the piece of game data associated with the piece of user identification information being selected as the usage target, satisfies a predetermined condition; and associate a reward with the piece of user identification information, in a case where access is made from a terminal device of a user after the execution history satisfies the predetermined condition.

9 Claims, 10 Drawing Sheets

(51) Int. Cl.
    *A63F 13/79*     (2014.01)
    *A63F 13/812*     (2014.01)
    *A63F 13/30*     (2014.01)
    *A63F 13/46*     (2014.01)
    *A63F 13/828*     (2014.01)
    *A63F 13/35*     (2014.01)

(52) U.S. Cl.
    CPC .............. *A63F 13/46* (2014.09); *A63F 13/79* (2014.09); *A63F 13/828* (2014.09); *A63F 13/812* (2014.09)

(56) References Cited

FOREIGN PATENT DOCUMENTS

JP    2013-202152 A    10/2013
KR    10-1352845 B1    2/2014

OTHER PUBLICATIONS

English Translation of Written Opinion of the International Searching Authority for PCT/JP2016/069092 accompanied with PCT/IB/373 and PCT/IB/338 dated Mar. 29, 2018.

Office Action dated Jul. 17, 2019, for corresponding KR Patent Application No. 10-2018-7007065.

FIG.2

| | G10 | | |
|---|---|---|---|
| SQUAD LIST | | | |
| CREATE NEW SQUAD | | | ←P11 |
| M16→ ★ SQUAD SQ1 | MANAGER : M1<br>FORMATION: 4-2-1-3 | TEAM SPIRIT: 51<br>TEAM STRENGTH : 958(Lv.1) | ←P12 |
| SQUAD SQ2 | MANAGER : M2<br>FORMATION: 4-4-2 | TEAM SPIRIT: 60<br>TEAM STRENGTH : 1000(Lv.1) | ←P13 |
| SQUAD SQ3 | MANAGER: M3<br>FORMATION: 4-3-3 | TEAM SPIRIT: 70<br>TEAM STRENGTH : 1200(Lv.2) | ←P14 |
| SQUAD SQ4 | MANAGER : M1<br>FORMATION: 4-2-1-3 | TEAM SPIRIT: 50<br>TEAM STRENGTH : 950(Lv.1) | ←P15 |

FIG.5

TBL101

| USER ID | POINT |
|---------|-------|
| U1 | 5000 |
| U2 | 3200 |
| U3 | 6800 |
| ... | ... |

FIG.6

| USER ID | SQUAD ID | SQUAD DATA | SELECTABLE SQUAD FLAG |
|---|---|---|---|
| U1 | SQ1 | SQUAD DATA SQ1 | 1 |
| U1 | SQ2 | SQUAD DATA SQ2 | 0 |
| U1 | SQ3 | SQUAD DATA SQ3 | 0 |
| U1 | SQ4 | SQUAD DATA SQ4 | 0 |
| U2 | SQ5 | SQUAD DATA SQ5 | 0 |
| U2 | SQ6 | SQUAD DATA SQ6 | 1 |
| ... | ... | ... | ... |

TBL102

FIG.7

TBL103

| MATCH ID | USER ID | SQUAD USED | OPPONENT SQUAD |  | MATCH DATE/TIME | MATCH RESULT | | COUNT TARGET FLAG |
|---|---|---|---|---|---|---|---|---|
| | | | USER | SQUAD | | WIN/LOSS FLAG | SCORE | |
| T1 | U12 | SQ39 | U1 | SQ1 | 2015/09/05 20:00:00 | 1 | 0-3 | 1 |
| T2 | U11 | SQ36 | U1 | SQ1 | 2015/09/05 21:10:00 | 1 | 0-1 | 1 |
| T3 | U10 | SQ32 | U1 | SQ1 | 2015/09/05 22:50:00 | 0 | 1-0 | 1 |
| T4 | U9 | SQ28 | U1 | SQ1 | 2015/09/05 23:15:00 | 1 | 0-2 | 1 |
| T5 | U8 | SQ25 | U1 | SQ1 | 2015/09/06 01:05:00 | 0 | 1-0 | 1 |
| T6 | U7 | SQ21 | U1 | SQ1 | 2015/09/06 08:30:00 | 1 | 0-1 | 1 |
| T7 | U6 | SQ20 | U1 | SQ1 | 2015/09/06 09:35:00 | 1 | 1-0 | 1 |
| T8 | U5 | SQ15 | U1 | SQ1 | 2015/09/06 11:00:00 | 0 | 1-0 | 1 |
| T9 | U4 | SQ11 | U1 | SQ1 | 2015/09/06 12:35:00 | 1 | 0-2 | 1 |
| T10 | U3 | SQ8 | U1 | SQ1 | 2015/09/06 14:10:00 | 0 | 1-0 | 1 |
| T11 | U2 | SQ5 | U1 | SQ1 | 2015/09/06 15:00:00 | 1 | 0-1 | 1 |
| ... | ... | ... | ... | ... | ... | ... | ... | ... |

FIG.8

TBL104

| USER ID | MATCH EXECUTION COUNT | PREVIOUS REWARD INPARTING DATE/TIME |
|---|---|---|
| U1 | 11 | 2015/09/05 12:00:00 |
| U2 | 8 | 2015/09/05 11:00:00 |
| U3 | 9 | 2015/09/05 11:30:00 |
| ... | ... | ... |

GAME SYSTEM, GAME CONTROL DEVICE, AND PROGRAM

CROSS-REFERENCE TO RELATED APPLICATION

The present disclosure contains subject matter related to that disclosed in Japanese Patent Application JP2015-180933 filed in the Japan Patent Office on Sep. 14, 2015 and International Patent Application PCT/JP2016/069092 filed in the Japan Patent Office on Jun. 28, 2016, the entire contents of which are hereby incorporated by reference.

TECHNICAL FIELD

The present invention relates to a game system, a game control device, and a program.

BACKGROUND ART

There is known a game system configured to execute game processing (e.g., competitive game processing) based on game data of a user and game data of another user. For example, there is known a game system configured to execute a soccer match based on soccer team data of a user and soccer team data of another user (see JP 2013-202152 A).

SUMMARY OF INVENTION

Technical Problem

Regarding the game system described above, it is required to implement a system for motivating the user to access the game system so that the user is induced to constantly play a game provided by the game system.

The present invention has been made in view of the problem described above, and an object thereof is to provide a game system, a game control device, and a program, which are capable of motivating a user to access the game system.

Solution to Problem

In order to solve the above-mentioned problem, a game system according to one embodiment of the present invention includes at least one processor configured to: select, from among a plurality of pieces of game data which are respectively associated with a plurality of pieces of user identification information, a piece of game data associated with a piece of user identification as a usage target to be used for game processing of another piece of game data associated with another piece of user identification information, to thereby execute the game processing; determine whether or not an execution history of the game processing, which has been executed with the piece of game data associated with the piece of user identification information being selected as the usage target, satisfies a predetermined condition; and associate a reward with the piece of user identification information, in a case where access is made from a terminal device of a user identified by the piece of user identification information after the execution history satisfies the predetermined condition.

A game control device according to one embodiment of the present invention is a game control device includes at least one processor configured to: perform control relating to a game configured so that a piece of game data associated with a piece of user identification is selected from among a plurality b if pieces of game data which are respectively associated with a plurality of pieces of user identification information as a usage target to be used for game processing of another piece of game data associated with another piece of user identification information, to thereby execute the game processing; acquire a result of determining whether or not an execution history of the game processing, which has been executed with the piece of game data associated with the piece of user identification information being selected as the usage target, satisfies a predetermined condition; and associate a reward with the piece of user identification information, in a case where access is made from a terminal device of a user identified by the piece of user identification information after the execution history satisfies the predetermined condition.

BRIEF DESCRIPTION OF DRAWINGS

FIG. 2 is a diagram for illustrating an example of a squad list screen image.

FIG. 5 is a table for showing an example of a point table.

FIG. 6 is a table for showing an example of a squad table.

FIG. 7 is a table for showing an example of a match execution history table.

FIG. 8 is a table for showing an example of a reward imparting management table.

DESCRIPTION OF EMBODIMENTS

Embodiments of the present invention are now described referring to the accompanying drawings.

Figure 1:
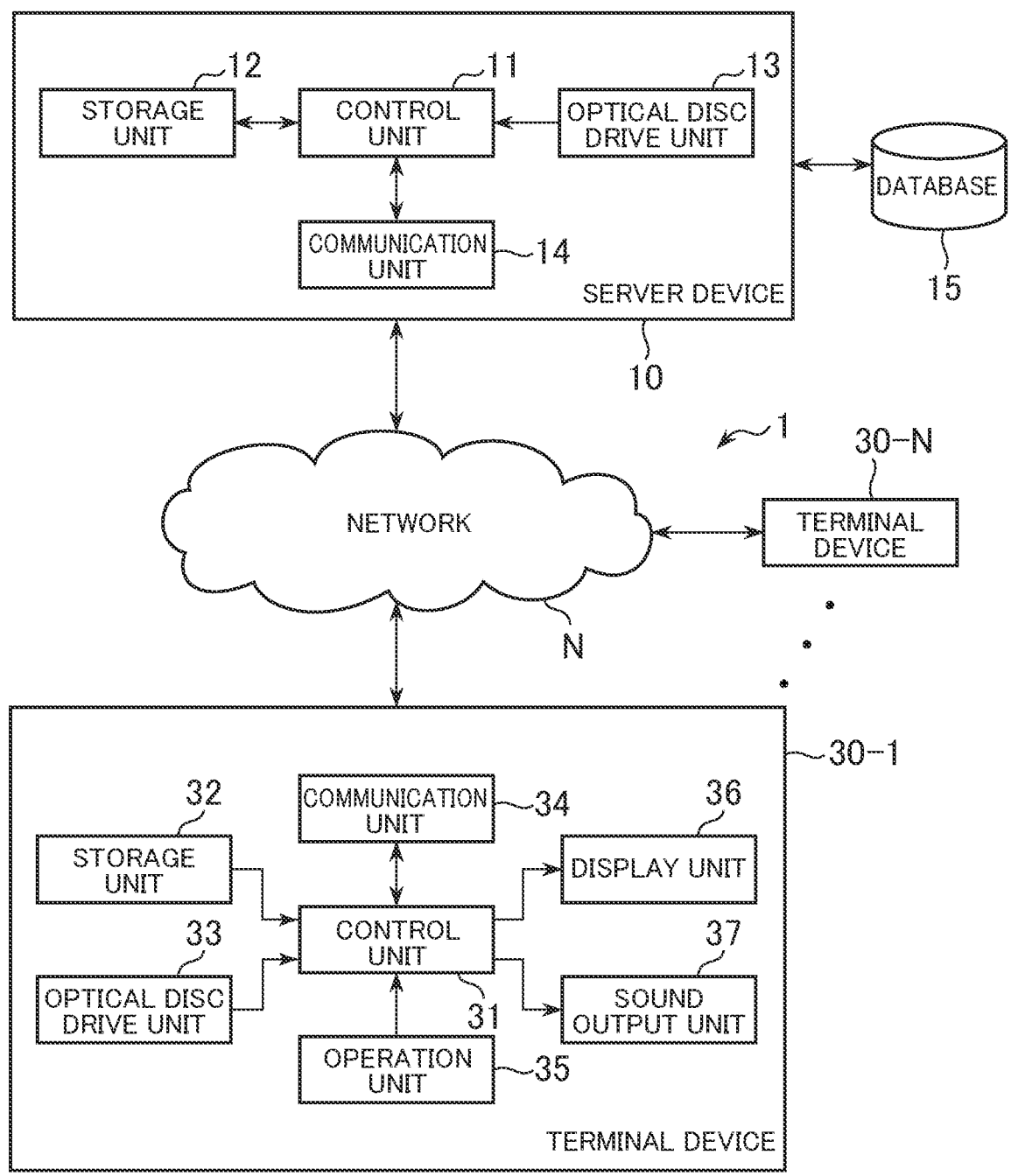
FIG. 1 is a diagram for illustrating an entire configuration of a game system according to an embodiment of the present invention.

[1. Configuration of Game System] FIG. 1 is an illustration of a configuration of a game system according to an embodiment of the present invention. As illustrated in FIG. 1, a game system 1 according to this embodiment includes a server device 10 and a plurality of terminal devices 30-1, . . . , and 30-N. The server device 10 and each of the plurality of terminal devices 30-1, . . . , and 30-N are connected to a network N so that the server device 10 and each of the plurality of terminal devices 30-1, . . . , and 30-N can communicate data to/from each other. In the following, the terminal devices 30-1, . . . , and 30-N are collectively referred to as a "terminal device 30".

The server device 10 is, for example, a server computer. As illustrated in FIG. 1, the server device 10 includes a control unit 11, a storage unit 12, an optical disc drive unit 13, and a communication unit 14. The control unit 11 includes at least one microprocessor (CPU), and executes information processing in accordance with an operating system and other programs stored in the storage unit 12. The storage unit 12 includes a main memory unit (e.g., RAM) and an auxiliary storage unit (e.g., non-volatile semiconductor memory, hard disk drive, or solid-state drive). The storage unit 12 is used for storing programs and data. The optical disc drive unit 13 reads programs and data stored in an optical disc (information storage medium). The communication unit 14 is used for communicating data to/from another device via the network N.

The server device 10 is enabled to access a database 15. The database 15 may be constructed in the server device 10, or may be constructed in another server computer separate from the server device 10.

The terminal device 30 is a computer operated by a user. Specifically, the terminal device 30 is a computer to be used by the user to play a game. For example, the terminal device 30 is a consumer game machine (stationary game machine), a portable game machine, an arcade game machine installed in, for example, an amusement center, a mobile phone (including smartphone), a mobile information terminal (including tablet computer), a desktop computer, or a laptop computer.

As illustrated in FIG. 1, the terminal device 30 includes a control unit 31, a storage unit 32, an optical disc drive unit 33, a communication unit 34, an operation unit 35, a display unit 36, and a sound output unit 37. The control unit 31, the storage unit 32, the optical disc drive unit 33, and the communication unit 34 have configurations similar to those of the control unit 11, the storage unit 12, the optical disc drive unit 13, and the communication unit 14 of the server device 10, respectively.

The operation unit 35 is used by the user to perform various kinds of operations. The operation unit 35 includes, for example, a button (key), a lever (stick), a touch panel, a mouse, or the like. The operation unit 35 may be used by the user to perform an operation via voice or gestures. The display unit 36 is, for example, a liquid crystal display, an organic EL display or the like, and displays various kinds of screens. The sound output unit 37 is, for example, a speaker, headphones or the like, and outputs sound data. The operation unit 35, the display unit 36, and the sound output unit 37 may be installed in the terminal device 30 itself, or may be provided as external devices connected to the terminal device 30.

Programs and data are supplied to the server device 10 or the terminal device 30 via an optical disc. That is, programs and data stored in the optical disc are read by the optical disc drive unit 13 or 33 to be stored into the storage unit 12 or 32. Components (e.g., memory card slot) for reading programs and data stored in an information storage medium (e.g., memory card) other than an optical disc may be included in the server device 10 or the terminal device 30. Then, programs and data may be supplied to the server device 10 or the terminal device 30 via the information storage medium other than ah optical disc. Alternatively, programs, and data may be supplied to the server device 10 or the terminal device 30 from a remote location via the network N.

[2. Outline of Game] In the game system 1, a piece of game data of a user is selected from among a plurality of pieces of game data of a plurality of users as a usage target to be used for game processing of another piece of game data of another user, to thereby execute the game processing. For example, in the game system 1, a piece of game data of a user is selected from among a plurality of pieces of game data of a plurality of users as an opponent of another piece of game data of another user, to thereby execute competitive game processing. In the following, a soccer game is described as an example of the game to be executed by the game system 1.

In a soccer game in this embodiment, a player character which is a game character representing a soccer player is given to the user.

For example, the user can use a predetermined game item or points to instruct a scout to search for a player character, and a player character recruited by the scout is given to the user.

The method of acquiring a player character is not limited to this method, and various kinds of methods can be adopted. For example, the user may be allowed to use a predetermined game item or points to acquire a player character by lottery, and a player character chosen by lottery may be given to the user. Further, for example, a player character may be given to the user depending on progress of the game of the user, or a player character may be given to the user as a reward (bonus) for some event.

Further, in the soccer game in this embodiment, the user collects player characters given as described above, and uses the collected player characters to form a squad. For example, the squad is formed of a manager character, eleven player characters serving as starters in a match, and a predetermined number (e.g., seven) of player characters serving as substitutes. The manager character is also given to the user similarly to the case of a player character, and the user can set the collected manager character in the squad. A strategy (e.g., formation or tactics) that can be adopted to the squad is determined depending on the manager character set in the squad. However, the manager character is not necessarily required, and the manager character may not be given to the user. The "squad" may be expressed also as, for example, "team", "group", or "deck" instead.

Figure 3:
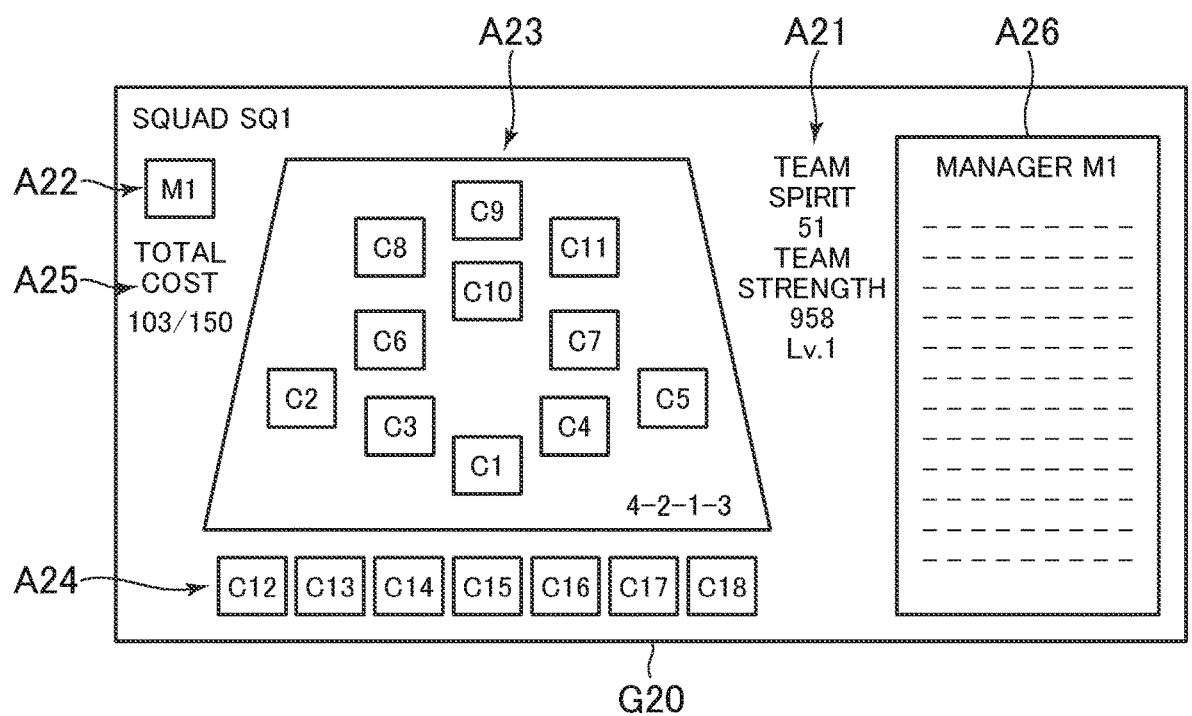
FIG. 3 is a diagram for illustrating an example of a squad formation screen image.

FIG. 2 and FIG. 3 are illustrations of examples of screen images to be displayed on the display unit 36 of the terminal device 30 to form a squad. FIG. 2 is an illustration of an example of a squad list screen image. A squad list screen image G10 represents a list of squads formed by the user. In the soccer game in this embodiment, one user can form and register a plurality of squads in advance. FIG. 2 is an illustration of a state in which four squads SQ1, SQ2, SQ3, and SQ4 are registered.

As illustrated in FIG. 2, processing objects P11, P12, P13, P14, and P15 are displayed in the squad list screen image G10. The "processing object" refers to, for example, an image, symbol, or text with which processing is associated.

Processing for newly creating a squad is associated with the processing object P11. When the user selects the processing object P11, a squad formation screen image for forming (creating) a new squad is displayed.

The processing object P12 corresponds to the squad SQ1, and information on the squad SQ1 is displayed on the processing object P12. Specifically, the manager character, formation, and parameters (team spirit and team strength) of the squad SQ1 are displayed.

The team spirit parameter represents an affinity between player characters and the manager character being members of the squad, or represents an affinity between the player characters. For example, as the affinity between player characters and the manager character or the affinity between the player characters becomes better, the value of the team spirit parameter is increased to improve cooperation within the squad.

The team strength parameter represents the strength of a squad. The team strength parameter contains a team strength value and a team strength level. In the case of the processing object P12 of FIG. 21 "958" corresponds to the team strength value, and "Lv. 1" corresponds to the team strength level. For example, the team strength value becomes higher as the skill of each player character who is a member of the squad is improved. In the soccer game in this embodiment, various kinds of skill parameters (e.g., passing skill parameter, dribbling skill parameter, shooting skill parameter, defending skill parameter, and the like) are set for each player character, and predetermined calculation processing is executed based on skill parameters of player characters who are members of the squad to calculate the team strength value. The team strength value represents an absolute strength of the squad. Meanwhile, the team strength level is increased by winning a match and decreased by losing a match. The team strength level represents a relative strength of the squad.

Processing for changing the squad SQ1 is associated with the processing object P12. When the user selects the processing object P12, a squad formation screen image for forming (changing) the squad SQ1 is displayed.

The processing objects P13, P14, and P15 correspond to the squads SQ2, SQ3, and SQ4, respectively, and pieces of information on the squads SQ2, SQ3, and SQ4 are displayed on the processing objects P13, P14, and P15, respectively. Processing for forming (changing) the squads SQ2, SQ3, and SQ4 is associated with the processing object P13, P14, and P15, respectively.

FIG. 3 is an illustration of an example of the squad formation screen image. FIG. 3 is an illustration of a squad formation screen image G20 in a case where the processing object P12 is selected in the squad list screen image G10, that is, in a case where the squad SQ1 is selected.

Parameters (team spirit and team strength) relating to the squad are displayed in an area A21 of the squad formation screen image G20.

The manager character set for the squad is displayed in an area A22. In an area A23, eleven player characters serving as starters among members of the squad are displayed, on an image representing a soccer field. Further, a formation adopted to the squad is displayed in the area A23. That is, in the area A23, player characters are assigned to respective positions of the formation adopted to the squad. In the example illustrated in FIG. 3, "4-2-1-3" is selected as the formation of the squad, and eleven player characters C1 to C11 are assigned to respective positions as starters. Player characters serving as substitutes among members of the squad are displayed in the area A24. In the example illustrated in FIG. 3, seven player characters C12 to C18 are set as substitutes. Although not shown in FIG. 3, face images of the manager character and player characters may be displayed in the areas A22, A23, and A24.

A total cost of the squad is displayed in an area A25. In the soccer game in this embodiment, cost parameters are set for respective player characters. The cost parameter represents a cost required for setting a player character as a member of the squad. The user is required to select a player character to be set as a member of the squad so that the total value of costs of player characters serving as members of the squad does not exceed an upper limit value. In the example illustrated in FIG. 3, the total value is "103", and the upper limit value is "150".

The total value may be prohibited from exceeding the upper limit value, or an adverse effect may be exerted on the squad when the total value has exceeded the upper limit value instead of prohibiting the total value from exceeding the upper limit value. For example, when the total value has exceeded the upper limit value, the strength of the squad may toe decreased. Specifically, cooperation within the squad may be degraded by decreasing the value of the team spirit parameter.

Information, on the manager character or player character is displayed in an area A26. In the example illustrated in FIG. 3, information on the manager character M1 is displayed, but when the user specifies, for example, the player character C10, information on the player character C10 is displayed in the area A26. In this case, for example, various kinds of skill parameters (e.g., passing skill parameter, dribbling skill parameter, shooting skill parameter, defending skill parameter, and the like) or a favorite position of the player character C10 is displayed in the area A26.

The user selects the manager character of the squad, a player character serving as a starter or a substitute, or a formation in the squad formation screen image G20, to thereby form the squad. Selectable options in the squad formation screen image G20 are not limited to those items, and for example, tactics (e.g., center attack or side attack) to toe adopted by the squad may be selected as well.

In the soccer game in this embodiment, the user can play a match against a computer (CPU) by using the squad formed as described above.

Further, in the soccer game in this embodiment, the squad of the user may be used as the squad of the computer when another user plays a match against the computer serving as an opponent. For example, the squad of a user U1 may be automatically selected to be used as the squad of the computer when another user U2 plays a match against the computer. In this case, a match between the squad of the user U2 and the squad of the computer (squad of user U1) is executed.

The match itself may be implemented in various kinds of known modes. For example, the user U2 may operate player characters, the user U2 may serve as the manager and watch the match to give overall instructions to player characters for some actions, or the user U2 may set information (e.g., tactics) in advance to cause player characters to perform actions under total control of the computer based on the information.

The user U1 can preliminarily set, from among a plurality of squads formed by himself or herself, a squad that can be selected as the squad of the computer when another user plays a match against the computer (that is, squad that can be selected as squad of opponent of another user; selectable squad). For example, in the example illustrated in FIG. 2, a mark M16 is displayed in association with the squad SQ1 (processing object P12). The mark M16 represents the fact that the squad SQ1 is set as the selectable squad. Only one squad may be set as the selectable squad, or a plurality of squads may be set as the selectable squads.

Further, in the soccer game in this embodiment, for example, when the user U1 accesses the game system 1 after the count of execution of a "match in which the squad of the user U1 is selected as the squad of the computer when another user plays a match against the computer" becomes equal to or larger than a reference count, the user U1 is given a reward (bonus). In the following, a description is given on the assumption that the reference count is "10".

Figure 4:
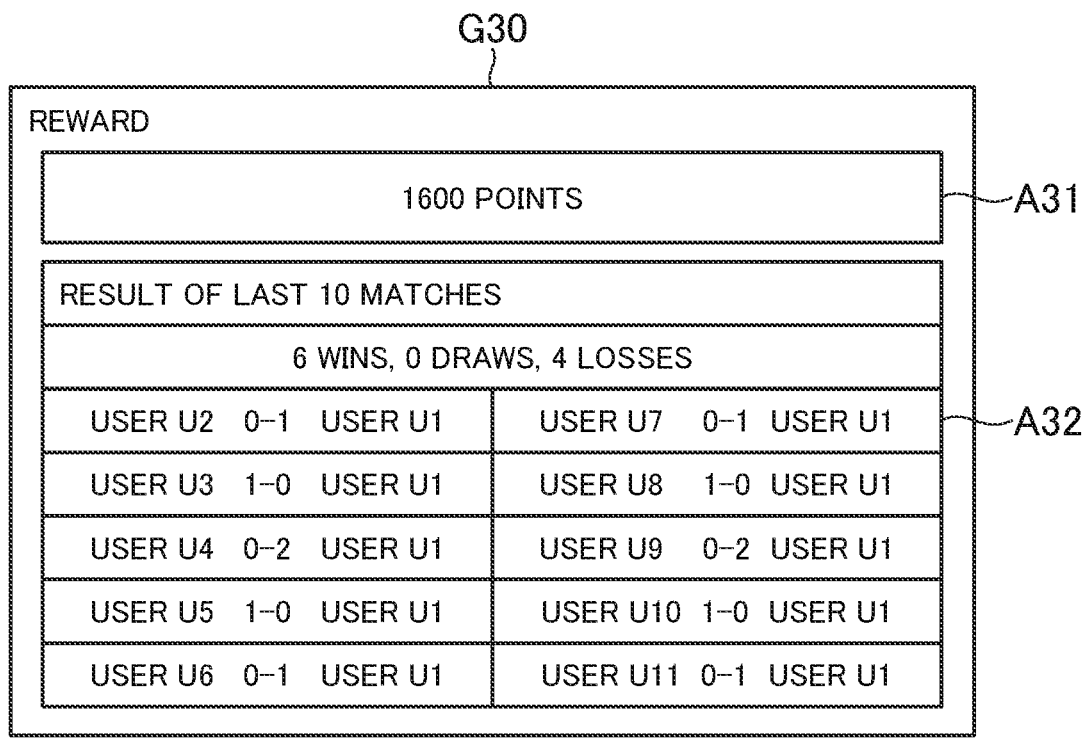
FIG. 4 is a diagram for illustrating an example of a reward screen image.

FIG. 4 is an illustration of an example of a reward screen image to be displayed on the display unit 36 of the terminal device 30 of the user U1 when the user U1 accesses the game system 1 after the count of execution of the above-described match becomes equal to or larger than 10.

As illustrated in FIG. 4, results of the last 10 matches are displayed in an area A32 of a reward screen image G30 from among "matches in which the squad of the user U1 is selected as the squad of the computer when another user plays a match against the computer". In the example illustrated in FIG. 4, it is indicated that the squad of the user U1 was selected and used as the squad of the computer when each of other users U2, U3, U4, U5, U6, U7, U8, U9, U10, and U11 played against the computer. Further, it is indicated that the result of those matches for the squad of the user U1 is "6 wins, 0 draws, 4 losses".

Further, a reward given to the user U1 is displayed in an area A31 of the reward screen image G30. In the example illustrated in FIG. 4, it is indicated that 1,600 points, which are usable in a game, are given to the user U1 as a reward. Those points can be used to acquire, for example, a player character, a manager character, or a game item, or to improve the skill of a player character.

At this time, the amount of points to be given to the user U1 is determined based on the results of the last 10 matches displayed in the area A32. For example, as the number of wins for the squad of the user U1 becomes larger, the amount of points to be given to the user U1 becomes larger.

As described above, every time a reward is given to the user U1, the count of execution, of the above-described, match is reset to 0. When the user U1 accesses the game system 1 again after the count of execution of the above-described match becomes equal to or larger than 10, a reward is given to the user U1.

The reward is not limited to points. For example, the player character or the manager character may be given to the user U1 as a reward. Further, for example, a game item may be given to the user U1 as a reward. When a player character, a manager character, or a game item is given as a reward, the skill, capability, or rarity of a player character, a manager character, or a game item to be given to the user U1 may be increased as the number of wins of the last 10 matches for the squad of the user U1 becomes larger.

As described above, in the game system 1, after the count of execution of a "match in which squad data of the user U1 is selected as squad data of the computer when another user plays a match against the computer" becomes equal to or larger than 10, when the user U1 accesses the game system, points are given to the user U1. Thus, it is possible to motivate the user U1 to access the game system 1. In other words, it is possible to motivate the user U1, who wishes to earn points, to access the game system 1 in order to check whether or not points have been earned.

[3. Structure of Data] In the following, an example of data required for implementing the function described above is described. The data is stored in, for example, the database 15.

Figure 5:
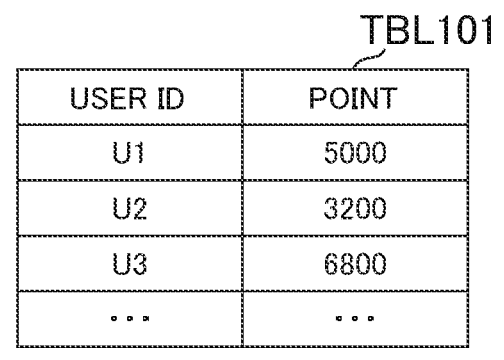

FIG. 5 is an example of a point table. A point table TBL101 is data representing points possessed by each user. The "points possessed by each user" refer to points ready to be used by the user by his or her own will.

As shown in FIG. 5, the point table TBL101 contains a "user ID" field and a "point" field, and the point is associated with the user ID in the point table TBL101. The "user ID" field represents information for uniquely identifying the user. The "point" field represents the amount of points possessed by the user.

FIG. 6 is an example of a squad table. A squad table TBL102 is data representing a list of squads formed by each user.

As shown in FIG. 6, the squad table TBL102 contains a "user ID" field, a "squad ID" field, a "squad data" field, and a "selectable squad flag" field, and the squad is associated with the user ID in the squad table TBL102. The "user ID" field is similar to the "user" field of the point table TBL101.

The "squad ID" field represents information for uniquely identifying a squad formed by the user. The "squad data" field represents data on a squad formed by the user. For example, the squad data contains the following data.
(a) Team spirit parameter
(b) Team strength parameter
(c) Total cost parameter
(d) Data on manager character set for squad
(e) Data (e.g., skill parameters and positions) on player characters set for squad as starters and substitutes
(f) Data on formation adopted by squad
(g) Data on tactics adopted by squad The "selectable squad flag" field represents whether or not the squad is selected as the selectable squad. As described above, the "selectable squad" refers to a squad that can be selected as the squad of the computer when another user plays against the computer. For example, a value "0" or "1" is registered in the "selectable squad flag" field. The value "0" represents the fact that the squad is not selected as the selectable squad, and the value "1" represents the fact that the squad is selected as the selectable squad.

FIG. 7 is an example of a match execution history table. A match execution history table TBL103 is data representing an execution history of a match between each user and the computer. As shown in FIG. 7, the match execution history table TBL103 contains a "match ID" field, a "user ID" field, a "squad used" field, an "opponent squad" field, a "match date/time" field, a "match result" field, and a "count target flag" field.

The "match ID" field represents information for uniquely identifying each match. The "user ID" field represents a user ID of a user who has played against the computer. The "squad used" field represents the squad ID of a squad used by the user when the user played against the computer.

The "opponent squad" field represents a squad used as the squad of the computer when the user played against the computer. The "opponent squad" field contains a "user" field and a "squad" field as subfields. Those subfields represent which squad of which user was used as the squad of the computer. When the "user" field and the "squad" field are "U1" and "SQ1", respectively, it is indicated that the squad SQ1 of the user U1 was used as the squad of the computer.

The "match date/time" field represents a date/time (e.g., match start date/time or match end date/time) of a match between the user and the computer. The "match result" field represents a result of a match between the user and the computer. The "match result" field contains a "win/loss flag" field and a "score" field as subfields. Those subfields represent a win/loss and scores of a match. For example, a value "0", "1", or "2" is registered in the "win/loss flag" field. The value "0" represents the fact that the user won. The value "1" represents the fact that the computer won. The value "2" represents the fact that the user and the computer ended in a draw. Further, scores of the user and the computer are stored in the "score" field. For example, when "0-1" is registered in the "score" field, the left number (0) represents the score of the user, and the right number (1) represents the score of the computer.

In the case of the example shown in FIG. 7, the top record, namely, a record with the match ID of "T1" represents the fact that a user U12 played against the computer by using a squad SQ39. Further, the top record represents the fact that the squad SQ1 of the user U1 is used as the squad of the computer in this match. Further, the top record represents the fact that the scores of the user U12 and the computer are "0" and "3", respectively, which means that the computer won. That is, it is indicated that the squad SQ1 of the user U1 used as the squad of the computer won against the squad SQ39 of the user U12.

The "count target flag" field represents whether or not the match is to be counted at the time of acquiring the count of execution of a "match in which the squad of the user is selected as the squad of the computer when another user plays against the computer". For example, the value "0" or "1" is registered in the "count target flag" field. The value "0" represents the fact that the match is not to be counted, and the value "1" represents the fact that the match is to be counted.

Every time the match between the user and the computer is executed, a record representing the match result is added to the match execution history table TBL103.

FIG. 8 is an example of a reward imparting management table. A reward imparting management table TBL104 is used to determine whether or not a reward is to be imparted to each user. As shown in FIG. 8, the reward imparting management table TBL104 contains a "user ID" field, a "match execution count" field, and a "previous reward imparting date/time" field. The "user ID" field is similar to the "user" field of the point table TBL101.

The "match execution count" field represents the count of execution of a "match in which the squad of the user is selected as the squad of the computer when another user plays against the computer". In other words, the "match execution count" field represents the number of times that the squad of the user has been selected as the squad of the computer in a match between another user and the computer. Every time a "match in which the squad of the user is selected as the squad of the computer when another user plays against the computer" is executed, 1 is added to the value of the "match execution count" field. In other words, every time the squad of the user is selected as the squad of the computer in a match between another user and the computer, 1 is added to the value of the "match execution count" field.

The "previous reward imparting date/time" field represents a previous date/time at which a reward was imparted to the user because the count of execution of the above-described match became equal to or larger than the reference count.

Figure 9:
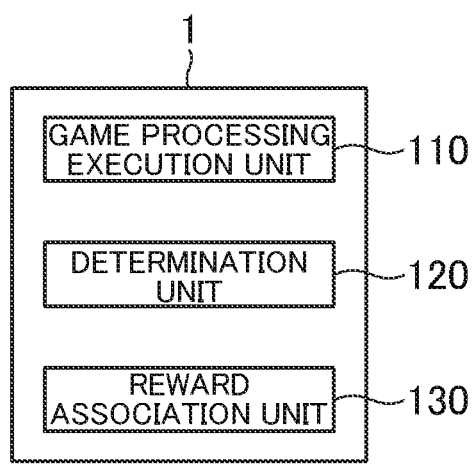
FIG. 9 is a functional block diagram of the game system according to an embodiment of the present invention.

[4. Functional Blocks] Next, a description is given of functional blocks to be implemented by the game system 1. FIG. 9 is an illustration of an example of functional blocks to be implemented by the game system 1. As illustrated in FIG. 9, the game system 1 includes a game processing execution unit 110, a determination unit 120, and a reward association unit 130.

[4-1] The game processing execution unit 110 is implemented by the control unit 11 of the server device 10 or the control unit 31 of the terminal device 30. The game processing execution unit 110 may be implemented by the control unit 11 of the server device 10 and the control unit 31 of the terminal device 30 cooperating with each other.

The game processing execution unit 110 selects, from among a plurality of pieces of game data which are respectively associated with a plurality of pieces of user identification information, a piece of game data associated with a piece of user identification information as a usage target to be used for game processing of another piece of game data associated with another piece of user identification information, to thereby execute the game processing.

In this case, the "user identification information" refers to information for uniquely identifying the user. In other words, the "user identification information" refers to information for specifying the user. For example, a user ID, a user name, a user account, or an email address is an example of the "user identification information".

In the case of the example of the soccer game described above, the user ID stored in the squad table TBL102 is an example of the "user identification information".

Further, the "piece of game data associated with a piece of user identification information" is game data stored in association with the user identification information.

Further, the "game data" is data to be used as a basis for executing the game processing. In other words, the "game data" is data that influences the result of the game processing. For example, the "game data" contains data on one or more game objects.

The "game object" is an object to be used in a game. For example, the game character or the game item is an example of the "game object". The game character or the game item may be displayed in a game card format on a game screen displayed on the display device.

The "data on a game object" contains, for example, data on the name of the game object, data on the appearance of the game object, data on a game object parameter, and the like. For example, a plurality of game object parameters are set for each game object, and data on the game object contains data on those plurality of game object parameters. The game processing is executed based on the plurality of game object parameters set for each game object. The plurality of game object parameters set for each game object influence the result of the game processing.

The "game object parameter" is, for example, data representing the capability of a game object. For example, the "game object parameter" is data representing the level or degree of the capability of a game object. When the game object is a game character serving as a soccer player, data (e.g., skill parameters) representing the levels of various kinds of skills of the game character such as passing, dribbling, and shooting, or data (e.g., level) representing the level of an entire skill of the game character is an example of the "data representing the capability of a game object".

The "game object parameter" may refer to, for example, data representing the state of a game object. For example, the "game object parameter" may be data representing the condition of a game object. When the game object is a game character serving as a soccer player, data representing the physical condition of the game character is an example of the "data representing the state of a game object". The hit point of a game character is also an example of the "data representing the state of a game object". Further, when the number of times that a game object can be used is limited, data representing a remaining number of times that a game object can be used or data representing the number of times that a game object has been used is also an example of the "data representing the state of a game object".

The "game object parameter" may refer to, for example, data representing the role of a game object. When the game object is a game character serving as a soccer player, data representing the position to which the game character is assigned is an example of the "data representing the role of a game object".

The "game object parameter" is not limited to numerical data, but may be data other than the numerical data.

For example, in the case of a game configured so that one or more game characters and one or more other game characters play a match against each other, data on the one or more game characters is an example of the "game data". In the case of a soccer game or a baseball game, soccer team data or baseball team data is an example of the "game data". The "soccer team data" contains, for example, data (e.g., skill parameters, and the like) on game characters belonging to a soccer team or data on a strategy (e.g., formation, tactics, and the like) of the soccer team. Further, in the case of a game configured so that the deck of game cards is used in a match, deck data is an example of the "game data". The "deck data" contains, for example, data on each game card contained in the deck.

The "game processing of another piece of game data associated with another piece of user identification information" refers to game processing that is executed based on another piece of game data associated with another piece of user identification information. In other words, the above-mentioned "game processing" refers to game processing of a game that is played by another user identified by another piece of user identification information.

Further, the "usage target to be used for game processing of another piece of game data associated with another piece of user identification information" refers to a piece of game data to be used for game processing of another piece of game data associated with another piece of user identification data. In other words, the above-mentioned "usage target" refers to a piece of game data that is used together with another piece of game data associated with another piece of user identification information in game processing of another piece of game data associated with another piece of user identification information. For example, the above-mentioned "usage target" refers to a piece of game data to be used as an opponent of another piece of game data associated with another piece of user identification information, or a piece of game data to be used for reinforcing (or supporting) another piece of game data associated with another piece of user identification information, in game processing of the another piece of game data associated with the another piece of user identification information.

For example, competitive game processing in which the user identified by another piece of user identification information plays a match based on another piece of game data associated with the another piece of user identification information is an example of the above-mentioned "game processing".

In this case, the "competitive game processing" refers to, for example, a match between another user and the computer (CPU). In such "competitive game processing", for example, game data (e.g., game character or the like) selected as the above-mentioned "usage target" is used as game data of the computer serving as an opponent (e.g., game character of opponent or the like). That is, in the "competitive game processing", the user identified by another piece of user identification information uses another piece of game data associated with the another piece of user identification information and the computer uses a piece of game data selected as the above-mentioned "usage target" so that the user and the computer play a match against each other.

In the "competitive game processing", the game data (e.g., game character or the like) selected as the above-mentioned "usage target" may be used as game data to reinforce another user (e.g., game character on the same side or the like).

Further, in the "competitive game processing", the computer may use both of another piece of game data associated with another piece of user identification information and a piece of game data selected as the above-mentioned "usage target" to automatically determine the result of the match. In other cases, users may play a match against each other in the "competitive game processing". That is, the users may use pieces of game data associated with their pieces of user identification information to play a match against each other. That is, another user identified by another piece of user identification information may use another piece of game data associated with the another piece of user identification information and the opponent user may use a piece of game data (corresponding to game data selected as usage target) associated with his or her user identification information so that another user and the opponent user play a match against each other.

Further, the wording "selecting as usage target" may refer to automatically (e.g., randomly) selecting any piece of game data as the usage target or selecting any piece of game data as the usage target based on a selection operation by the user identified by another piece of user identification information. Further, the wording "selecting any piece of game data as the usage target based on a selection operation by the user" refers to, for example, selecting a piece of game data selected by the user as the usage target, or selecting a piece of game data associated with user identification information selected by the user as the usage target.

In the case of the example of the soccer game described above, squad data stored in the squad table TBL102 is an example of the "game data". For example, squad data of the user U1 is an example of the game data associated with the user ID "U1".

Further, in the case of the example of the soccer game described above, the competitive game processing (that is, soccer match processing) in which another user uses his or her squad data to play a match against the computer is an example of the "game processing". Further, the squad data to be used as squad data of the computer (that is, squad, data of opponent) is an example of the "usage target".

Thus, in the case of the example of the soccer game described above, the game processing execution unit 110 selects, from among a plurality of pieces of squad data of users, a piece of squad data of the user U1 as squad data of the computer in the case of a match between another user and the computer (usage target), to thereby execute the competitive game processing.

For example, in a case of selecting a piece of squad data of the computer for a match between the user U2 and the computer, the game processing execution unit 110 selects, from among pieces of squad data of users other than the user U2 and having substantially the same team strength level as that of the squad data of the user U2, any piece of squad data randomly (based on random number). For example, when the team strength level of the squad data of the user U1 is substantially the same as the team strength level of the squad data of the user U2, the squad data of the user U1 may be selected as squad data of the computer in a case where the user U2 plays a match against the computer.

When there are a plurality of pieces of squad data of the user U1 (that is, when user ID "U1" and plurality of pieces of squad data are associated with each other), the game processing execution unit 110 sets a piece of squad data selected by the user U1 in advance from among those plurality of pieces of squad data as "squad data selectable as squad data of the computer when another user plays a match against the computer (usage target)" (selectable squad). Further, the game processing execution unit 110 prohibits a piece of squad data, which is not selected by the user U1 in advance from those plurality of pieces of squad data, from being set as the selectable squad.

For example, under the states of FIG. 2 and FIG. 6, the user U1 selects the squad data SQ1 as the selectable squad from among pieces of squad data SQ1 to SQ4 of the user U1. Thus, the game processing execution unit 110 sets the squad data SQ1 as the selectable squad and does not set the squad data SQ2 to SQ4 as the selectable squad.

[4-2] The determination unit 120 and the reward association unit 130 are implemented by the control unit 11 of the server device 10 (example of game control device).

The determination unit 120 determines whether or not an execution history of the game processing of another piece of game data associated with another piece of user identification information, which has been executed with the piece of game data associated with the piece of user identification information being selected as the usage target, satisfies a predetermined condition. Further, the reward association unit 130 associates a reward with the user identification information when access is made from the terminal device 30 of the user identified by the user identification information after the above-described execution history satisfies the predetermined condition.

In this case, the "execution history of the game processing of another piece of game data associated with another piece of user identification information, which has been executed with the piece of game data associated with the piece of user identification information toeing selected as the usage target" refers to, for example, an "execution history of the game processing of another piece of game data associated with any other piece of user identification information, which has been executed with the piece of game data associated with the piece of user identification information being selected as the usage target". The "execution history of the game processing of another piece of game data associated with another piece of user identification information, which has been executed with the piece of game data associated with the piece of user identification information being selected as the usage target" may refer to an "execution history of the game processing of another piece of game data associated with another specific piece of user identification information, which has been executed with the piece of game data associated with the piece of user identification information being selected as the usage target".

Further, the "execution history of the game processing" refers to, for example, a count of execution of the game processing. Further, the "count of execution of the game processing" refers to the number of times that the game processing has been executed, and, in other words, is the number of times that the piece of game data associated with the piece of user identification information has been selected as the usage target to be used for the game processing of another piece of game data associated with another piece of user identification information. The "execution history of the game processing" may refer to, for example, a result of execution of the game-processing. Fox example, when the "game processing" refers to competitive game processing, the "execution history of the game processing" may fee a result of the match. The "result of the match" refers to, for example, a win/loss of the match. The win/loss does is not always required to be determined, and the match may end in a draw. When the match involves scoring, the score difference is also the "result of the match".

Further, the "predetermined condition" refers to a condition that is required to be satisfied in order to associate a reward with user identification information. Further, the "predetermined condition" refers to a condition on the execution history of the game processing. For example, a condition on the count of execution of the game processing is an example of the "predetermined condition". Specifically, a condition as to whether or not the count of execution of the game processing becomes equal to or larger than a predetermined multiple count is an example of the "predetermined condition". Further, for example, a condition on the result of execution of the game processing is also an example of the "predetermined condition". Specifically, for example, when the "game processing" refers to competitive game processing, a condition of whether or not the number of winnings becomes equal to or larger than a predetermined multiple count is also an example of the "predetermined condition". The "predetermined condition" may refer to a condition on the count of execution of the game processing and the result of execution of the game processing. Specifically, a condition of whether or not a numerical value calculated based on the count of execution of the game processing and the result of execution of the game processing becomes equal to or larger than a predetermined reference value (or equal to or smaller than predetermined reference value) is also an example of the "predetermined condition".

Further, the wording "when access is made from the terminal device" refers to a case of receiving a request transmitted by the terminal device 30. In this case, the "request" refers to, for example, a request for user authentication, a request for data for displaying a specific screen image (e.g., top screen image, main screen image, or the like), a request for execution of the game, or a request for participation in the game.

Further, the wording "associate a reward with the piece of user identification information" refers to imparting a reward to the user identified by the user identification information.

For example, the wording "associate a reward with the piece of user identification information" refers to additionally associating points with the user identification information under a state in which some points are already associated with the user identification information, to thereby increase points associated with the user identification information. In short, the wording "associate a reward with the piece of user identification information" refers to giving points to the user. That is, the wording "associate a reward with the piece of user identification information" refers to increasing points held by the user.

The "point" refers to, for example, an entity serving as a currency in the game. For example, the user can acquire a new game character in exchange for points. Further, for example, the user can extend a period in which game characters possessed by himself or herself can be used, or can increase the number of times that the game characters possessed by himself or herself can be used, in exchange for points. Further, for example, the user can acquire a new game item in exchange for points.

The "point" is not limited to an entity serving as a currency in the game. For example, the "point" may be points (e.g., experience values or the like) for improving the capabilities of a game object. That is, the user may be able to improve the capability of a game object in exchange for points.

Further, for example, the wording "associate a reward with the piece of user identification information" may refer to associating a new game object (e.g., game character, game item, or the like) with user identification information, or additionally associating a game object with the user identification information under a state in which the game object is already associated with the user identification information, to thereby increase the number of the game objects associated with the user identification information. In short, the wording "associate a reward with the piece of user identification information" may refer to, for example, giving a game object to the user. That is, the wording "associate a reward with the piece of user identification information" may refer to giving a new game object that is not possessed by the user to the user, or additionally giving a game object already possessed by the user to the user, to thereby increase the number of the game objects held by the user.

The "reward" is not limited to points or game objects, but may be various kinds of rewards set depending on content of the game. For example, the "reward" may refer to temporarily or permanently changing a parameter (parameter other than points) associated with the user so that the user is given an advantage.

In the case of the soccer game described above, the "predetermined condition" refers to a condition of whether or not the count of execution of the competitive game processing in which the squad data of the user is selected as the "squad data of the computer when another user plays a match against the computer" becomes equal to or larger than 10. Further, the "reward" refers to points.

Thus, the determination unit 120 determines whether or sot the count of execution of the competitive game processing in which the squad data of the user is selected as the "squad data of the computer when another user plays a match against the computer" becomes equal to or larger than 10. Then, after the above-described count of execution becomes equal to or larger than 10, the reward association unit 130 gives points to the user when access is made from the terminal device 30 of the user.

For example, under the states shown in FIG. 7 and FIG. 8, the squad data SQ1 of the user U1 is selected as the squad data of the computer when the other users U2 to U12 played against the computer, and the count of execution of the competitive game processing in which the squad data of the user U1 is selected as the "squad data of the computer when another user plays a match against the computer" becomes 11. As a result, the determination unit 120 determines that the count of execution of the above-described competitive game processing becomes equal to or larger than 10. Thus, the reward association unit 130 gives points to the user U1 when access is made from the terminal device 30 of the user U1.

When the count of execution of the competitive game processing in which the squad data of the user U1 is selected as the "squad data of the computer when another user plays a match against the computer" is larger than 10, the reward association unit 130 determines points to be given to the user U1 based on a result of execution of the last 10 times of competitive game processing among the total times of the competitive game processing.

In this case, the "result of execution of the last 10 times of competitive game processing" is a result of execution of the competitive game processing executed last (match with match ID of "T11" in the example shown in FIG. 7) and the competitive game processing (matches with match IDs of "T10" to "T2" in the example shown in FIG. 7) executed two times to ten times before.

Further, the wording "determine points to be given to the user U1 based on a result of execution of the last 10 times of competitive game processing" refers to, for example, determining points to be given to the user U1 based on the numbers of wins, losses, and draws, a winning rate, a goal difference, and other statistics of the squad of the user U1 in the last 10 matches.

Specifically, as the number of wins, the winning rate, or the goal difference of the squad of the user U1 becomes larger, the reward association unit 130 gives a larger amount of points to the user U1. In short, as the number of wins, the winning rate, or the goal difference of the squad of the user U1 becomes larger, the reward association unit 130 imparts a reward more advantageous for the user U1 to the user U1. When the reward to be imparted to the user U1 is a game object, as the number of wins, the winning rate, or the goal difference of the squad of the user U1 becomes larger, the reward association unit 130 may increase the capability or rarity of a game object to be given to the user U1, or increase the number of game objects to be given to the user.

Further, after the reward association unit 130 gives points to the user U1, the determination unit 120 determines whether or not the count of execution of the competitive game processing in which the squad data of the user U1 is selected as the "squad data of the computer when another user plays a match against the computer" after the points are given to the user U1 becomes equal to or larger than 10. When the above-described count of execution after the points are given to the user U1 becomes equal to or larger than 10 and then access is made from the terminal device 30 of the user U1, the reward association unit 130 imparts an additional reward to the user U1.

Figure 10:
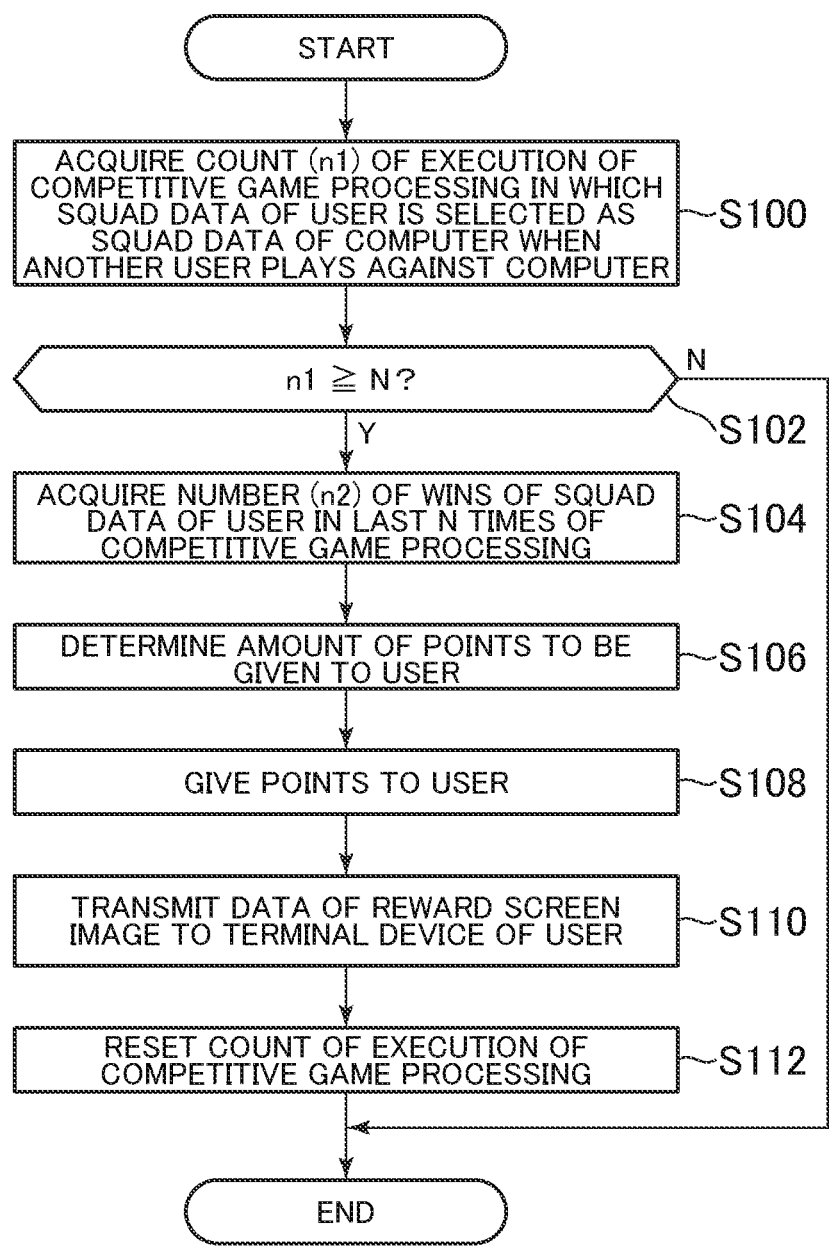
FIG. 10 is a flowchart for illustrating an example of processing to be executed in the game system.

[5. Processing] Next, a description is given of processing for implementing the functional blocks described above. FIG. 10 is a flow diagram for illustrating an example of processing to be executed by the server device 10 when the terminal device 30 of the user has accessed the server device 10. The control unit 11 of the server device 18 executes the processing illustrated in FIG. 10 in accordance with programs to cause the control unit 11 to function as the determination unit 120 and the reward association unit 130. In the following, a description is given of processing illustrated in FIG. 10 on the assumption that access has been made from the terminal device 30 of the user U1.

As illustrated in FIG. 10, first, the control unit 11 acquires the count (n1) of execution of the competitive game processing in which the squad data of the user U1 is selected as the "squad data of the computer when another user plays a match against the computer" (S100).

When the terminal device 30 of the user U1 accesses the server device 10, the user ID "U1" of the user U1 is transmitted from the terminal device 30 to the server device 10. Therefore, the control unit 11 refers to the reward imparting management table TBL104 to acquire the value of the "match execution count" field of a record in which the user ID "U1" is registered in the "user ID" field, as the count of execution (n1).

Alternatively, the control unit 11 may refer to the match execution history table TBL103 to acquire the number of records satisfying both of the following conditions A and B as the count of execution (n1).
(A) The user ID "U1" is registered in the "user" field of the "opponent squad" field.
(B) The value "1" is registered in the "count target flag" field.

Alternatively, the control unit 11 may refer to the reward imparting management table TBL104 to acquire the previous reward imparting date/time of the user U1. That is, the control unit 11 may acquire the date/time registered in the "previous reward earning date/time" field of a record in which the user ID "U1" is registered in the "user ID" field. Then, the control unit 11 may refer to the match execution history table TBL103 to acquire the number of records satisfying both of the following conditions C and D as the count of execution (n1).
(C) The user ID "U1" is registered in the "user" field of the "opponent squad" field.
(D) A date/time later than the previous reward imparting date/time is registered in the "match date/time" field.

After the execution of Step S100, the control unit 11 determines whether or not the count of execution (n1) acquired in Step S100 is equal to or larger than a reference count (N; e.g., 10) (S102).

When the count of execution (n1) is equal to or larger than the reference count (N), the control unit 11 acquires the number (n2) of wins of the squad data of the user U1 in the last N times of competitive game processing among the total times of the competitive game processing in which the squad data of the user U1 is selected as the "squad data of the computer when another user plays a match against the computer" (S104).

For example, the control unit 11 refers to the match execution history table TBL103 to sort records satisfying both of the above-mentioned conditions A and B in descending order of the match date/time, and acquire first to N-th records. Alternatively, the control unit 11 may refer to the match execution history table TBL103 to sort records satisfying both of the above-mentioned conditions C and D in descending order of the match date/time, and acquire first to N-th records.

Then, the control unit 11 acquires, as the number of wins (n2), the number of records in which the value "1" is registered in the "win/loss flag" field of the "match result" field from among the records acquired as described above. For example, in the case of the example shown in FIG. 7, the number of records in which the value "1" is registered in the "win/loss flag" field from among records in which "T2" to "T11" are registered in the "match ID" field is acquired as the number of wins (n2).

After the execution of Step S104, the control unit 11 determines the amount of points to be given to the user U1 based on the number of wins (n2) acquired in Step S104 (S106).

For example, association relationship information representing an association relationship between the number of wins and the amount of points is stored in the storage unit 12. Specifically, a table or a mathematical expression for associating the number of wins with the amount of points is stored in the storage unit 12 as the association relationship information. The association relationship information is set so that, for example, as the number of wins becomes larger, the amount of points becomes larger. The control unit 11 acquires the amount of points associated with the number of wins (n2) based on the association relationship information, and determines the acquired amount as the amount of points to be given to the user U1.

After the execution of Step S106, the control unit 11 gives the amount of points determined in Step S106 to the user U1 (S108). That is, the control unit 11 accesses the point table TBL101, and adds the amount of points determined in Step S106 to the value of the "point" field of a record in which the user ID "U1" is registered in the "user ID" field.

After the execution of Step S108, the control unit 11 transmits data of the reward screen image G30 to the terminal device 30 of the user U1 (S110). This data may be the reward screen image G30 itself, or may be data required for the terminal device 30 to generate the reward screen image G30. Further, for example, this data is generated based on the match execution history table TBL103 or the amount of points determined in Step S106. In this case, in the terminal device 30, the reward screen image G30 is displayed on the display unit 36 based on the above-mentioned data.

After the execution of Step S110, the control unit 11 executes processing for resetting the above-described count of execution for the user U1 (S112). For example, the control unit 11 accesses the match execution history table TBL103 to update the value of the "count target flag" field of records satisfying both of the above-described conditions A and B to "0". Further, the control unit 11 accesses the reward imparting management table TBL104 to update the value of the "match execution count" field of a record in which the user ID "U1" is registered in the "user ID" field to "0", and update the date/time registered in the "previous reward imparting date/time" of the same record to the current date/time.

According to the game system 1 described above, after the count of execution of the competitive game processing in which the squad data of the user U1 is selected as the "squad data of the computer when another user plays a match against the computer" becomes equal to or larger than 10, when the user U1 accesses the game system, points are given to the user U1. Thus, it is possible to motivate the user U1 to access the game system 1. In other words, it is possible to motivate the user U1, who wishes to earn points, to access the game system 1 in order to check whether or not points have been given.

In the game system described in JP 2013-202152 A, when game data of the user U1 is selected by another user U2 as an opponent and the competitive game processing is executed, a reward is imparted to the user U2 (that is, user who has selected an opponent) based on the number of times that the game data of the user U1 was selected in the past. In the game system described in JP 2013-202152 A, a reward is imparted to the "user who has selected an opponent", and thus the user U1 cannot acquire a reward by simply accessing the game system 1, and the user U1 himself or herself is required to select game data of another user as an opponent for a match in order to earn rewards. Thus, the game system described in JP 2013-202152 A cannot sufficiently motivate the user U1 to access the game system. In this manner, in the game system described in JP 2013-202152 A, a reward is imparted to the "user who has selected an opponent". In contrast, in the game system 1 according to this embodiment, a reward is imparted to the "user who is selected as an opponent", and thus a reward is imparted to the user U1 even when the user U1 himself or herself does not select game data of another user as an opponent for a match. As a result, it is possible to motivate the user U1 to access the game system 1.

Further, according to the game system 1, when the above-described count of execution after points are given to the user U1 becomes equal to or larger than 10 and then the user U1 accesses the game system 1, points are given to the user U1 again. Thus, it is possible to motivate the user U1, who wishes to earn points repeatedly, to access the game system 1 constantly. That is, in the game system 1, when points are given to the user U1, the count of execution is reset to 0. Then, when the count of execution becomes equal to or larger than 10 again after points are given to the user U1 and then the user U1 accesses the game system 1, points are given to the user U1 again. Thus, accessing the game system 1 at the time when the count of execution is 10 gives a more significant advantage to the user U1 than accessing the game system 1 at the time when the count of execution becomes larger than 10. That is, when the count of execution becomes 10, accessing the game system 1 as early as possible gives the maximum advantage to the user U1. Therefore, it is possible to motivate the user U1, who wishes to earn points, to access the game system 1 in consideration of the best timing. As a result, it is possible to increase the number of times of access of the user U1.

Further, according to the game system 1, when the count of execution of the above-described competitive game processing becomes larger than 10 and then the user U1 accesses the game system 1, points to be given to the user U1 are determined based n a result of execution of the last 10 times of competitive game processing among the total times of the competitive game processing (refer to Steps S104 and S106 of FIG. 10). Thus, a result of execution of the competitive game processing before the last 10 times of competitive game processing is not considered in the determination of points to be given to the user U1. For example, in the case of the example shown in FIG. 7, results of matches having match IDs of "T2" to "T11" are considered in the determination of points to be given to the user U1, and a result of a match having a match ID of "T1" is not considered in the determination of points to be given to the user U1. Thus, accessing the game system 1 at the time when the above-described count of execution is 10 is more efficient for the user U1 than accessing the game system 1 at the time when the count of execution becomes larger than 10 in that a result of execution of all the competitive game processing is considered in determination of points to be given to the user U1. As a result, when the count of execution becomes 10, accessing the game system 1 as early as possible before the count of execution becomes larger than 10 is more efficient for the user U1, and thus it is possible to motivate the user U1, who wishes to earn points, to access the game system 1 in consideration of the best timing of acquiring a reward efficiently, resulting in the increase in the number of times of access of the user U1.

Further, according to the game system 1, the user U1 can select "a piece of squad data that can be selected as the squad of the computer when another user plays a match against the computer" from among pieces of his or her squad data (refer to FIG. 2).

[6. Modification Example] The present invention is not limited to the embodiment described above.

[6-1] As described above, the reward association unit 130 gives points to the user when access is made from the terminal device of the user after the count of execution of the competitive game processing in which the squad data of the user, is selected as an opponent of another user becomes equal to or larger than 10 (in short, after the execution history of the game processing satisfies the predetermined condition).

In view of this point, when selecting an opponent of another user from among pieces of squad data of a plurality of users (in short, when selecting a usage target from among pieces of squad data of plurality of users), the game processing execution unit 110 may select a piece of squad data for which the count of execution is smaller than 10 (in short, squad data for which the execution history does not satisfy the predetermined condition) as the opponent (usage target) preferentially over a piece of squad data for which the count of execution becomes equal to or larger than 10 (in short, squad data for which the execution history satisfies the predetermined condition).

The wording "select a piece of squad data for which the count of execution is smaller than 10 as the opponent preferentially over a piece of squad data for which the count of execution, becomes equal to or larger than 10" refers to, for example, setting a piece of squad data for which the count of execution is smaller than 10 as squad data selectable as the opponent, and avoiding setting a piece of squad data for which the count of execution becomes equal to or larger than 10 as squad data selectable as the opponent. Alternatively, the wording "select a piece of squad data for which the count of execution is smaller than 10 as the opponent preferentially over a piece of squad data for which the count of execution becomes equal to or larger than 10" may refer to, for example, setting a probability of a piece of squad data for which the count of execution is smaller than 10 being selected as the opponent higher than a probability of a piece of squad data for which the count of execution becomes equal to or larger than 10 being selected as the opponent.

With the configuration described above, it is possible to suppress a deviation of the count of execution (execution history) of the competitive game processing among pieces of squad data.

[6-2] In Step S112 of FIG. 10, the count of execution of the competitive game processing is reset to 0, but the count of execution may not be reset to 0. For example, when points are given in Step S108, the reference count (N) may be updated to N+n1 instead of executing the processing of Step S112. For example, when the reference count (N) is 10 and points are given in Step S108 under a state in which the count of execution (n1) is 11, the reference count (N) may be updated to 21. Then, after that, in Step S102, it may be determined whether or not the count of execution (n1) is equal to or larger than 21.

[6-3] In the above, a description has been mainly given of an example in which the present invention is applied to the soccer game, but the present invention can be applied to a game other than the soccer game.

The present invention can be applied to a "game configured so that a piece of game data associated with a piece of user identification information is selected from among a plurality of pieces of game data which are respectively associated with a plurality of pieces of user identification information as a usage target to be used for game processing of another piece of game data associated with another piece of user identification, information, to thereby execute the game processing".

For example, the present invention can be applied to a "game configured so that a piece of game data associated with a piece of user identification information is selected from among a plurality of pieces of game data which are respectively associated with a plurality of pieces of user identification information as an opponent (usage target) of another piece of game data associated with another piece of user identification information". In the above, the soccer game is described as an example of such a game, but the present invention can be applied to a sports game other than the soccer. Further, the present invention can be applied to a game configured so that a game character of the user is selected as an "enemy game character when a game character of another user fights against the enemy game character".

Further, for example, the present invention can also be applied to a "game configured so that apiece of game data associated with a piece of user identification information is selected from among a plurality of pieces of game data which are respectively associated with a plurality of pieces of user identification information as an object (usage target) for reinforcing (or supporting) another piece of game data associated with another piece of user identification information". For example, the present invention can also be applied to a game configured so that the game character of the user is selected as an "ally game character (game character on the same side) when a game character of another user fights against an enemy character". Alternatively, the present invention can also be applied to a game configured so that a game item of the user is selected as a "game item to be used by another user when the another user fights against an enemy character". In those games, for example, whether or not to impart a reward to the user, the type of the reward, or the amount of the reward may be determined based on whether or not a game character or a game item of the user has contributed to the game played by another user or the degree of contribution (corresponding to example of the "execution result of game processing").

[7. Supplementary Notes] From the description given above, the present invention is understood as follows, for example. In order to facilitate understanding of the present invention, the reference symbols provided in the drawings are enclosed in parentheses and assigned to components appropriately. However, the present invention is not to be limited to the modes illustrated in the drawings as a result of this.

(1) A game system according to one embodiment of the present invention is a game system (1) including: game processing execution means (110) for selecting, from among a plurality of pieces of game data (e.g., squad data) which are respectively associated with a plurality of pieces of user identification information (e.g., user ID), a piece of game data associated with a piece of user identification as a usage target (e.g., opponent in competitive game processing) to be used for game processing of another piece of game data associated with another piece of user identification information, to thereby execute the game processing; determination means (120) for determining whether or not an execution history of game processing of another piece of game data associated with another piece of user identification information, which has been executed with the piece of game data associated with the piece of user identification information being selected as the usage target, satisfies a predetermined condition; and reward association means (130) for associating a reward with the piece of user identification information, in a case where access is made from a terminal device (30) of a user identified by the piece of user identification information after the execution history satisfies the predetermined condition.

(8) A game control device according to one embodiment of the present invention is a game control device (10), which is configured to perform control relating to a game configured so that a piece of game data associated with a piece of user identification is selected from among a plurality of pieces of game data which are respectively associated with a plurality of pieces of user identification information, as a usage target to be used for game processing of another piece of game data associated with another piece, of user identification information, to thereby execute the game processing, includes: means (130) for acquiring a result of determining whether or not an execution history of game processing of another piece of game data associated with another piece of user identification information, which has been executed with the piece of game data associated with the piece of user identification information being selected as the usage target, satisfies a predetermined condition; and reward association means (130) for associating a reward with the piece of user identification information, in a case where access is made from a terminal device (30) of a user identified by the piece of user identification information after the execution history satisfies the predetermined condition.

(9) Further, a program according to one embodiment of the present invention is a program for causing a computer to function as the game system (1) of any one of Items (1) to (7) or as the game control device (10) of Item (8).

(10) Further, an information storage medium according to one embodiment of the present invention is a computer-readable information storage medium having the program of Item (9) recorded thereon.

(11) Further, a method of controlling a game system according to one embodiment of the present invention is a method of controlling a game system (1), the method including: selecting, from among a plurality of pieces of game data which are, respectively associated with a plurality of pieces of user identification information, a piece of game data associated with a piece of user identification as a usage target to be used for game processing of another piece of game data associated with another piece of user identification information, to thereby execute the game processing; determining (S102) whether or not an execution history of game processing of another piece of game data associated with another piece of user identification information, which has been executed with the piece of game data associated with the piece of user identification information being selected as the usage target, satisfies a predetermined condition; and associating (S108) a reward with the piece of user identification information, in a case where access is made from a terminal device (30) of a user identified by the piece of user identification information after the execution history satisfies the predetermined condition.

(12) Further, a method of controlling a game control device according to one embodiment of the present invention is a method of controlling a game control device (10), the game control device (10) being configured to perform control relating to a game configured so that a piece of game data associated with a piece of user identification is selected from among a plurality of pieces of game data which are respectively associated with a plurality of pieces of user identification information as a usage target to be used for game processing of another piece of game data associated with another piece of user identification information, to thereby execute the game processing, the method including: acquiring (S102) a result of determining whether or not an execution history of game processing of another piece of game data associated with smother piece of user identification information, which has been executed with the piece of game data associated with the piece of user identification information being selected as the usage target, satisfies a predetermined condition; and associating (S108) a reward with the piece of user identification information, in a case where access is made from a terminal device (30) of a user identified by the piece of user identification information after the execution history satisfies the predetermined condition.

According to the embodiments of the present invention described in Items (1) and (8) to (12), when the user accesses the game system after the execution history of the game processing of another piece of game data of another user, which has been executed with the piece of game data of the user being selected as a usage target, satisfies a predetermined condition, a reward is imparted to the user, and thus it is possible to motivate the user to access the game system.

(2) According to one embodiment of the present invention, the determination means (120) may be configured to determine, after the reward association means (130) associates the reward with the piece of user identification information, whether or not the execution history after the association satisfies a predetermined condition. The reward association means (130) may be configured to associate a reward with the piece of user identification information additionally, in a case where the execution history after the association satisfies the predetermined condition and then access is made from the terminal device (30).

According to the embodiment of the present invention described in Item (2), when the execution history after a reward is imparted to the user satisfies the predetermined condition and then the user accesses the game system, a reward is imparted to the user again. Thus, it is possible to motivate the user, who wishes to earn a reward repeatedly, to access the game system constantly.

(3) According to one embodiment of the present invention, the predetermined condition may be a condition of whether or not a count of execution of game processing of another piece of game data associated with another piece of user identification information, which has been executed with the piece of game data associated with the piece of user identification information being selected as the usage target, becomes equal to or larger than a predetermined multiple count. The reward association means (130) may be configured to associate a reward with the piece of user identification information, in a case where access is made from the terminal device (30) after the count of execution becomes equal to or larger than the predetermined multiple count.

According to the embodiment of the present invention described in Item (3), when the user accesses the game system after the count of execution of the game processing of another piece of game data of another user, which has been executed with the piece of game data of the user being selected as a usage target, becomes equal to or larger than a predetermined multiple count, a reward is imparted to the user, and thus it is possible to motivate the user, who wishes to earn a reward, to access the game system in order to check whether or not a reward has been imparted.

(4) According to one embodiment of the present invention, the determination means (120) may be configured to determine, after the reward association means (130) associates the reward with the piece of user identification information, whether or not the count of execution after the association becomes equal to or larger than a predetermined multiple count. The reward association means (130) may be configured to associate a reward with the piece of user identification information additionally, in a case where the count of execution after the association becomes equal to or larger than the predetermined multiple count and then access is made from the terminal device (30).

According to the embodiment of the present invention described in Item (4), accessing the game system at the time when the count of execution is a predetermined multiple count gives a more significant advantage to the user than accessing the game system at the time when the count of execution becomes larger than the predetermined multiple count. That is, when the count of execution becomes the predetermined multiple count, accessing the game system as early as possible gives the maximum advantage to the user. Therefore, it is possible to motivate the user, who wishes to earn a reward, to access the game system in consideration of the best timing. As a result, it is possible to increase the number of times of access of the user.

(5) According to one embodiment of the present invention, in a case where the count of execution is larger than the predetermined multiple count, the reward association means (130) may determine a reward to be associated with the piece of user identification information based on a result of the last predetermined multiple count of execution of game processing of another piece of game data associated with another piece of user identification information, which has been executed with the piece of game data associated with the piece of user identification information being selected as the usage target.

According to the embodiment of the present invention described in Item (5), when the user accesses the game system after the count of execution of the game processing of another piece of game data of another user, which has been executed with the piece of game data of the user being selected as a usage target, becomes larger than the predetermined multiple count, a reward is determined based on a result of the last predetermined multiple count of execution of the game processing among the total times of the game processing. Thus, a result of execution of the game processing executed before the last predetermined multiple count of the game processing is not considered in determination of rewards. Therefore, accessing the game system at the time when the count of execution is the predetermined multiple count is more efficient for the user, who wishes to earn a reward, than accessing the game system at the time when the count of execution becomes larger than the predetermined multiple count in that a result of execution of all the game processing is used for determination of rewards. As a result, when the count of execution becomes the predetermined multiple count, accessing the game system as early as possible before the count of execution becomes larger than the predetermined multiple count is more efficient for the user, and thus it is possible to motivate the user, who wishes to earn a reward, to access the game system in consideration of the best timing of acquiring a reward efficiently, resulting in the increase in the number of times of access of the user.

(6) According to one embodiment of the present invention, the game processing execution means (110) may be configured to select, as the usage target, a piece of game data for which the execution history fails to satisfy the predetermined condition preferentially over a piece of game data for which the execution history satisfies the predetermined condition from among the plurality of pieces of game data which are respectively associated with the plurality of pieces of user identification information.

According to the embodiment of the present invention described in Item (6), it is possible to suppress a deviation of the execution history of the game processing among pieces of game data.

(7) According to one embodiment of the present invention, in a case where a plurality of pieces of game data are associated with the piece of user identification information, the game processing execution means (110) may set, as game data selectable as the usage target, a piece of game data selected by a user identified by the piece of user identification information in advance from among the plurality of pieces of game data, and prohibit pieces of game data other than the piece of game data selected by the user in advance from among the plurality of pieces of game data from being set as game data selectable as the usage target.

According to the embodiment of the present invention described in Item (7), the user can select a piece of game data that can be selected as a usage target to be used for the game processing of another piece of game data of another user from among a plurality of pieces of the own game data.

While there have been described what are at present considered to be certain embodiments of the invention, it will be understood that various modifications may be made thereto, and it is intended that the appended claims cover all such modifications as fall within the true spirit and scope of the invention.

The invention claimed is:

1. A game system, comprising at least one processor configured to:
    select, from among a plurality of pieces of game data which are respectively associated with a plurality of pieces of user identification information, a piece of game data associated with a piece of user identification as a usage target to be used for game processing of another piece of game data associated with another piece of user identification information, to thereby execute the game processing;
    determine whether or not an execution history of the game processing, which has been executed with the piece of game data associated with the piece of user identification information being selected as the usage target, satisfies a predetermined condition; and
    associate a reward with the piece of user identification information, in a case where access is made from a terminal device of a user identified by the piece of user identification information after the execution history satisfies the predetermined condition.

2. The game system according to claim 1,
    wherein the at least one processor is configured to:
    determine, after the reward is associated with the piece of user identification information, whether or not the execution history after the association satisfies a predetermined condition, and
    associate a reward with the piece of user identification information additionally, in a case where the execution history after the association satisfies the predetermined condition and then access is made from the terminal device.

3. The game system according to claim 1,
    wherein the predetermined condition includes a condition of whether or not a count of execution of the game processing, which has been executed with the piece of game data associated with the piece of user identification information being selected as the usage target, becomes equal to or larger than a predetermined multiple count, and
    wherein the at least one processor is configured to associate a reward with the piece of user identification information, in a case where access is made from the terminal device after the count of execution becomes equal to or larger than the predetermined multiple count.

4. The game system according to claim 3,
    wherein the at least one processor is configured to:
    determine, after the reward is associated with the piece of user identification information, whether or not the count of execution after the association becomes equal to or larger than a predetermined multiple count, and
    associate a reward with the piece of user identification information additionally, in a case where the count of execution after the association becomes equal to or larger than the predetermined multiple count and then access is made from the terminal device.

5. The game system according to claim 3,
    wherein the at least one processor is configured to, in a case where the count of execution is larger than the predetermined multiple count, determine a reward to be associated with the piece of user identification information based on a result of the last predetermined multiple count of execution of the game processing which has been executed with the piece of game data associated with the piece of user identification information being selected as the usage target.

6. The game system according to claim 1,
    wherein the at least one processor is configured to select, as the usage target, a piece of game data for which the execution history fails to satisfy the predetermined condition preferentially over a piece of game data for which the execution history satisfies the predetermined condition.

7. The game system according to claim 1,
    wherein the at least one processor is configured to set, in a case where a plurality of pieces of game data are associated with the piece of user identification information, as game data selectable as the usage target, a piece of game data selected by a user identified by the piece of user identification information in advance from among the plurality of pieces of game data, and prohibit pieces of game data other than the piece of game data selected by the user from being set as game data selectable as the usage target.

8. A game control device, comprising at least one processor configured to:
    perform control relating to a game configured so that a piece of game data associated with a piece of user identification is selected from among a plurality of pieces of game data which are respectively associated with a plurality of pieces of user identification information as a usage target to be used for game processing of another piece of game data associated with another piece of user identification information, to thereby execute the game processing;
    acquire a result of determining whether or not an execution history of the game processing, which has been executed with the piece of game data associated with the piece of user identification information being selected as the usage target, satisfies a predetermined condition; and
    associate a reward with the piece of user identification information, in a case where access is made from a terminal device of a user identified by the piece of user identification information after the execution history satisfies the predetermined condition.

9. A non-transitory computer-readable information storage medium having a program recorded thereon, the program for causing a computer to:
    perform control relating to a game configured so that a piece of game data associated with a piece of user identification is selected from among a plurality of pieces of game data which are respectively associated with a plurality of pieces of user identification information as a usage target to be used for game processing of another piece of game data associated with another piece of user identification information, to thereby execute the game processing;
    acquire a result of determining whether or not an execution history of the game processing, which has been executed with the piece of game data associated with the piece of user identification information being selected as the usage target, satisfies a predetermined condition; and
    associate a reward with the piece of user identification information, in a case where access is made from a terminal device of a user identified by the piece of user identification information after the execution history satisfies the predetermined condition.

* * * * *